(12) United States Patent
Pazdziora (10) Patent No.: US 8,291,402 B2
(45) Date of Patent: Oct. 16, 2012

(54) USING SYSTEM FINGERPRINTS TO ACCELERATE PACKAGE DEPENDENCY RESOLUTION

(75) Inventor: Jan Pazdziora, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 1125 days.

(21) Appl. No.: 11/947,469

(22) Filed: Nov. 29, 2007

(65) Prior Publication Data

US 2009/0144719 A1    Jun. 4, 2009

(51) Int. Cl.
*G06F 9/44* (2006.01)
*G06F 9/445* (2006.01)

(52) U.S. Cl. .......................... 717/168; 717/174; 717/178

(58) Field of Classification Search ........................ None
See application file for complete search history.

(56) References Cited

U.S. PATENT DOCUMENTS

| | | | |
|---|---|---|---|
| 6,681,391 B1 * | 1/2004 | Marino et al. | 717/175 |
| 6,738,932 B1 * | 5/2004 | Price | 714/38.11 |
| 7,441,230 B2 * | 10/2008 | Kainz et al. | 717/105 |
| 7,549,148 B2 * | 6/2009 | Cross et al. | 717/174 |
| 7,630,381 B1 * | 12/2009 | Roskind et al. | 370/395.42 |
| 8,149,844 B1 * | 4/2012 | Roskind et al. | 717/174 |
| 2002/0129347 A1 * | 9/2002 | Fischer | 717/168 |
| 2003/0233645 A1 * | 12/2003 | Cohen et al. | 717/168 |
| 2005/0132350 A1 * | 6/2005 | Markley et al. | 717/168 |
| 2005/0132357 A1 * | 6/2005 | Shell et al. | 717/174 |
| 2005/0138563 A1 * | 6/2005 | Cromer et al. | 715/735 |
| 2005/0229011 A1 * | 10/2005 | Ebringer et al. | 713/189 |
| 2006/0020936 A1 * | 1/2006 | Wyatt | 717/168 |
| 2006/0156129 A1 * | 7/2006 | Midgley et al. | 714/732 |
| 2006/0235846 A1 * | 10/2006 | Murray | 707/7 |
| 2007/0080964 A1 * | 4/2007 | Kainz et al. | 345/440 |
| 2008/0088455 A1 * | 4/2008 | Lu et al. | 340/572.4 |
| 2009/0055817 A1 * | 2/2009 | Maj | 717/178 |
| 2010/0037215 A1 * | 2/2010 | Meiss et al. | 717/168 |
| 2010/0242037 A1 * | 9/2010 | Xie et al. | 717/178 |

OTHER PUBLICATIONS

Pauls et al., "Eureka—A Resource Discovery Service for Component Deployment", 2004 Springer-Verlag Berlin Heidelberg, LNCS 3083, pp. 159-174 <http://www.springerlink.com/content/gufmtb1j8ylh44p2/fulltext.pdf>.*

Zhang Xu, "dPAN: distributed package management network internship report", Aug. 16, 2010, Dépôt Universitaire de Mémoires Après Soutenance, pp. 1-36 <http://dumas.ccsd.cnrs.fr/docs/00/53/07/95/PDF/Zhang_Xu.pdf>.*

Liu et al., "A Formal Framework for Component Deployment", 2006 ACM, OOPSLA'06, pp. 1-19 http://dl.acm.org/citation.cfm?doid=1167473.1167502>.*

Hradilek et al., "Red Hat Enterprise Linux-6 Deployment Guide", 2011 Red Hat, Inc., pp. 1-660 <http://docs.redhat.com/docs/en-US/Red_Hat_Enterprise_Linux/6/pdf/Deployment_Guide/Red_Hat_Enterprise_Linux-6-Deployment_Guide-en-US.pdf>.*

* cited by examiner

*Primary Examiner* — Thuy Dao
*Assistant Examiner* — Ben C Wang
(74) *Attorney, Agent, or Firm* — Lowenstein Sandler PC (57) ABSTRACT

A computer system can be updated and/or reconfigured quickly by preparing a list of attributes of the system and computing a fingerprint based on the list. The fingerprint serves as a key to a database of precomputed upgrade plans. If a matching plan is found, it can be executed to update the computer system without performing a time-consuming dependency resolution operation. If no applicable precomputed plan is found, a plan must then be computed, but the computed plan may be saved in the database to speed up future system updates.

20 Claims, 7 Drawing Sheets

USING SYSTEM FINGERPRINTS TO ACCELERATE PACKAGE DEPENDENCY RESOLUTION

FIELD

The invention relates to computer configuration management. More specifically, the invention relates to techniques for speeding up software package dependency checking and resolution.

BACKGROUND

In the mid-1980s, the Free Software Foundation launched a project to produce a complete set of software for the inexpensive and increasingly powerful computers then becoming available. In the decades since, thousands of amateur and professional software developers have contributed programs directly to the project, or have released "Open Source" software under terms that permit it to be used in a free (as in speech) system. Today, this software often equals or surpasses commercially-available software in quality and functionality, and viable ancillary businesses have developed to provide support and coordination services for computer owners who wish to take advantage of the wealth of available software.

Ironically, the enormous number of free and open-source software packages available causes problems for users when the independently-developed and maintained packages are modified or improved. For example, consider two applications, A1 and A2, which depend on functionality provided by a library L. If new features are added to the library and adopted by application A1, upgrading A1 and L may impair the operation of A2 (which has not yet been modified to use the new library). More generally, keeping track of the interdependencies of thousands of software packages that may be installed on a system is a daunting task.

Companies such as Red Hat Corporation of Raleigh, N.C., have built successful businesses by curating software package collections and developing system maintenance tools that make it easy to set up and operate a general-purpose computer using free and open-source software. Package upgrades are tracked and new versions are harmonized to provide a complete, coherent, functional system that carries the benefits of new features and fixed bugs, while avoiding the "bleeding edge" problems of inconsistent versions and support component incompatibilities. (Of course, Red Hat Corporation is more than a mere aggregator of others' software: Red Hat engineers also develop new applications and improve existing packages. Much of this work is released under permissive, open-source license terms, further enlarging the universe of free-software capability.)

A central problem in managing a software distribution comprising many interdependent components or "packages" is that of dependency resolution, where the implications of one change to a hardware-and-software configuration are analyzed recursively to determine what other changes to the configuration might also be required. Fortunately, this problem is reasonably well-understood. Apart from circular dependencies and a small set of similar pathological cases, dependency resolution can be carried out automatically, and the results used to control software installation, upgrade and removal operations. Unfortunately, the time required to perform a dependency resolution grows in proportion to the number of dependencies between components, and not just in proportion to the number of components. A method of caching the results of a dependency resolution can speed up operations when similar changes are to be made to multiple computers.

BRIEF DESCRIPTION OF DRAWINGS

Embodiments of the invention are illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

DETAILED DESCRIPTION

Embodiments of the invention prepare a "fingerprint" to encapsulate relevant aspects of a system's hardware and/or software configuration, and use the fingerprint to find pre-computed configuration-change plans for accomplishing a software or hardware change. If a suitable precomputed plan is located, a time-consuming dependency-resolution operation can be avoided. Data collected to prepare the fingerprints and statistics regarding the system changes performed can be used to guide software development and other configuration-management tasks.

Figure 1:
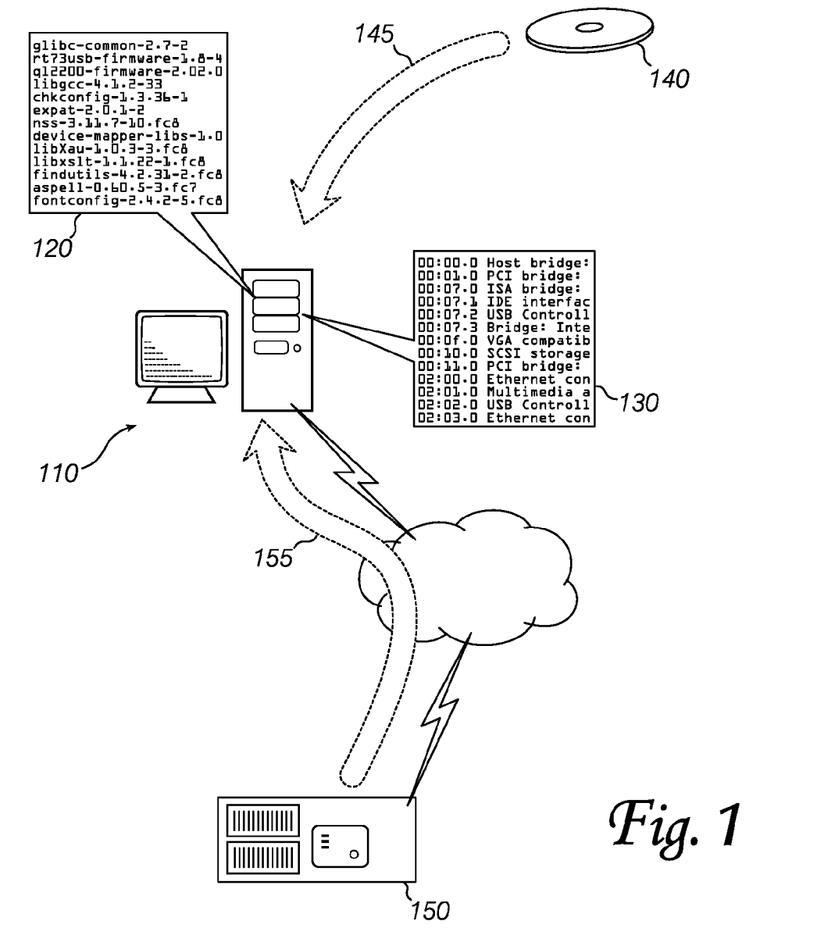
FIG. 1 is an overview of an embodiment of the invention, showing a computer system to be upgraded and information considered in planning the upgrade.

FIG. 1 shows a computer system 110 and partial lists of software components 120 and hardware components 130 that are installed. (Complete listings of software and hardware components might include hundreds or thousands of individual items.) A user of system 110 wishes to change the system configuration by, for example, installing any new or updated software present on an upgrade medium such as CDROM 140, or available from a network-accessible repository 150. A dependency resolution process, typically performed at system 110 during upgrade processing, refers to information about the system's current software configuration 120 and hardware configuration 130 to determine what new features and functionality are available from CDROM 140 or software repository 150, and what additional configuration changes are required if those features are to be installed. The user's approval of a proposed upgrade plan may be sought, and (if approved) the upgrade plan is executed by loading new software (145, 155) and changing or removing obsolete items.

Figure 2:
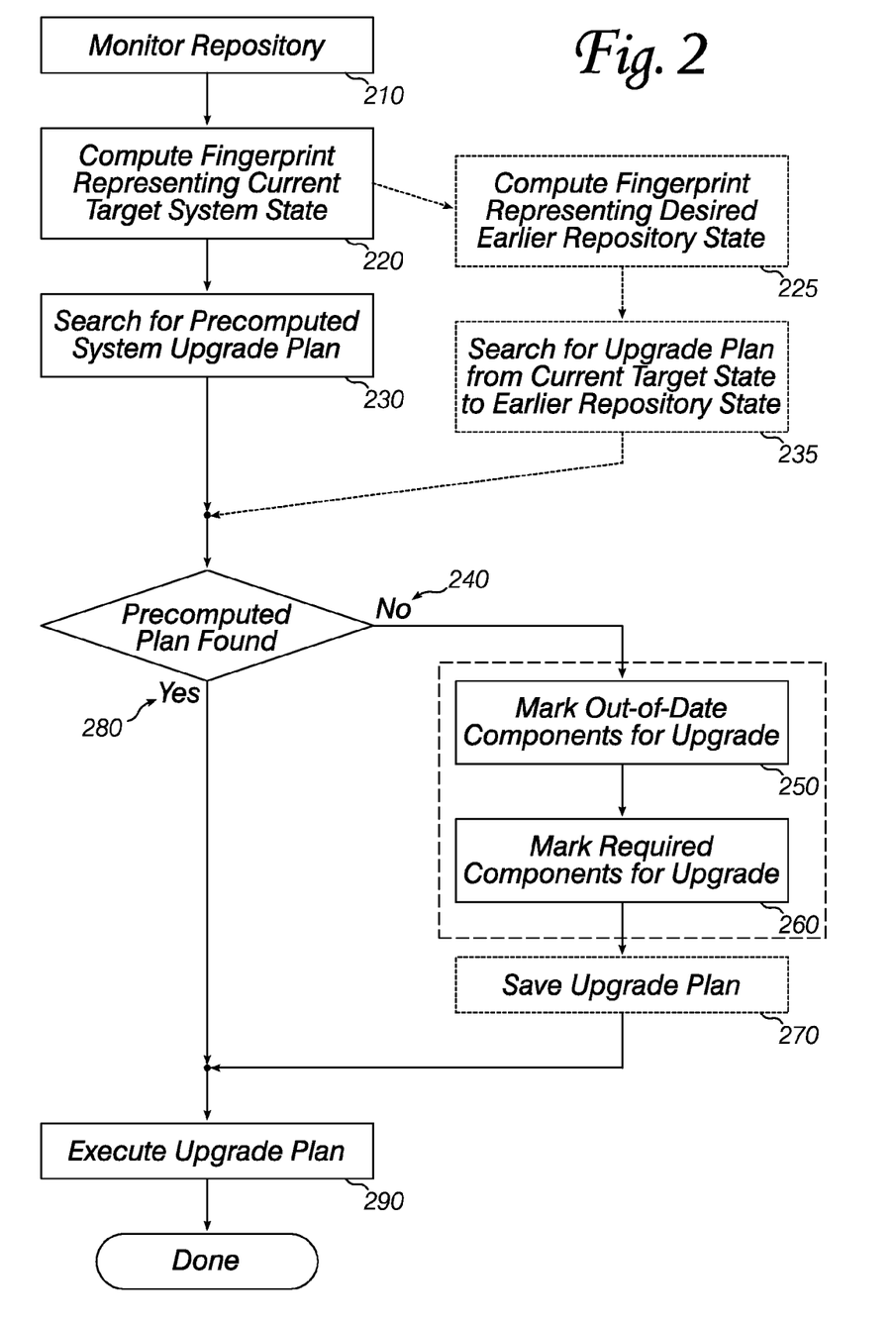
FIG. 2 is a flow chart outlining an embodiment of the invention.

FIG. 2 is a flow chart outlining a dependency resolution process according to an embodiment of the invention. A resource repository is monitored to detect changes in its contents (210). Monitoring may be accomplished by periodically checking a last-modified date of the repository, by receiving a notification sent when the repository is changed, or by another method. It is not necessary to discover the exact nature of the change at this stage; the change notification merely serves to trigger subsequent activities. In some embodiments, a system administrator has a subscription to a software update service. When new or updated software is available, the administrator receives a distribution medium such as a CDROM or DVD disk. Receiving and inserting the disk into a computer system starts the subsequent processing.

The current state of a target system is examined and a "fingerprint" representing the current state is produced (220). This fingerprint is used to search a database of precomputed configuration change plans for a plan that is suitable for use on the target system (230). In some embodiments, the repository may collect historical versions of software packages, so a configuration change could bring the target system "up to date" with respect to an earlier version of the repository. In this case, two fingerprints might be used to locate a precomputed configuration change plan in the database: the fingerprint of the target system and the fingerprint of the desired repository state. As shown in phantom lines in FIG. 2, an embodiment may produce a fingerprint of the desired repository state (225) and use the target system fingerprint and repository fingerprint together to find a change plan (235).

If no precomputed change plan is found in the database (240), traditional dependency resolution procedures are used: out-of-date components installed on the target system are marked for upgrade (250), and then any components required by the upgrades are also marked (260). Upgrade marking proceeds through iteration and recursion until a complete upgrade plan is prepared. The plan ensures that, if a component will be upgraded, a compatible version of every resource that the component depends on will also be available. After dependency resolution is completed, the upgrade plan may be saved (270) in a database, indexed by the fingerprint, so that a subsequent target system can benefit from the just-computed plan. If a precomputed plan was found (280), the time-consuming dependency resolution can be avoided. Finally, the precomputed (or just-computed) upgrade plan is executed to update the target system (290).

A central challenge in the foregoing method is representing the current configuration state of a target system in a robust, concise way. An embodiment could use a raw list of all the relevant attributes and components of the system, but the large and variable number of list items makes this approach unwieldy. In addition, because a system can arrive at its current configuration through a number of possible paths (e.g., installing all the components at once, or installing and removing various components at different times), the lists of two systems with the same configuration may be different because list items appear in a different order. To remedy both of these problems, an embodiment prepares a system fingerprint according to the method outlined in FIG. 3.

Figure 3:
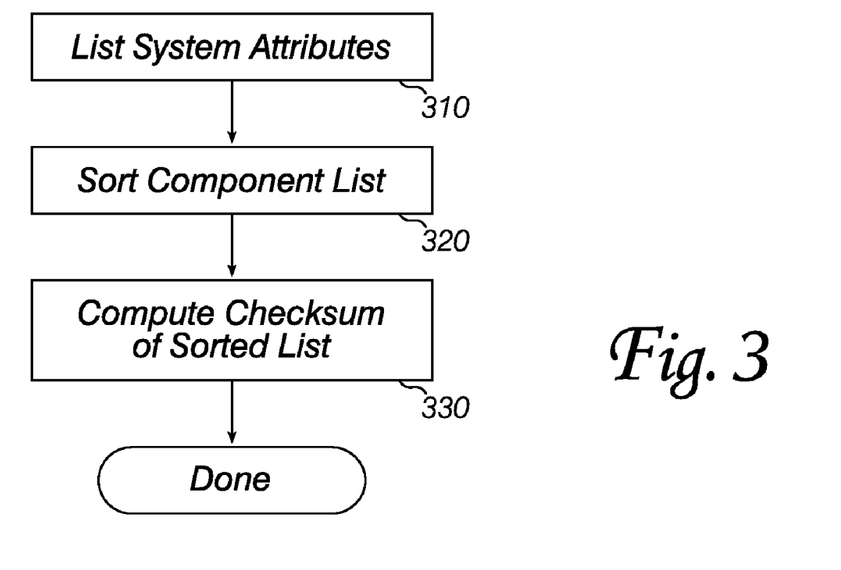
FIG. 3 is a flow chart showing one way of producing a system fingerprint.

First, a list of system attributes (i.e., installed hardware and software components) is produced (310). The list may be obtained by referring to a database containing information collected during earlier component installations and/or configuration changes. The Red Hat Package Manager, RPM, maintains such a database and can produce a suitable list. A list can also be made from a directory of the files stored on the system's mass storage devices. Each list element may indicate a single system component (e.g., a file or a hardware device) or a group of related components (a "package"). A list element may also correspond to a group of packages. For example, a system may have been configured with a number of software packages that that all serve a similar purpose—a "Writer" suite containing word processing, page layout, and printing tools, say, or an "Artist" suite containing drawing and image processing tools. Each list element should contain some indication of the version, revision or release of the component, package or suite, so that an earlier item can be distinguished from a more recent item. For example, the list element for the writer's software suite may resemble the string "writer-software-v1.02-x86". However, since the list is processed automatically, the elements need not have any particular form, nor be intelligible to a human reader. In some embodiments, a list element may simply be a hash of the files and other data objects that make up the corresponding package.

Next, the list of attributes is sorted (320). To avoid sorting-order ambiguities caused by different language's character sets ("locale issues"), list elements should be treated as plain ASCII strings, or even as binary strings. If list elements are hashes of the package contents, as suggested above, they will not have national-language dependencies and can be sorted easily and reliably. Finally, a checksum or hash of the sorted list of elements is computed (330). This value serves as a fingerprint to represent the system's current configuration: those of skill in the relevant arts will recognize that a checksum or hash produced as described will be the same for two systems with identical component configurations, and will almost certainly be different for two systems with different configurations (no matter how small the difference between those configurations). Note that a checksum, in the narrowest sense of the word, is not a very good mechanism for detecting differences between two sets of data. Much better is a cyclic redundancy check ("CRC") or a cryptographically-secure hash function such as the Secure Hash Algorithm 1 ("SHA-1") or Message Digest algorithm 5 ("MD5"). For the purposes of an embodiment of the invention, a suitable checksum or hash should reliably produce a different value (fingerprint) if there is any difference in the length or content of a list of components.

Figure 4:
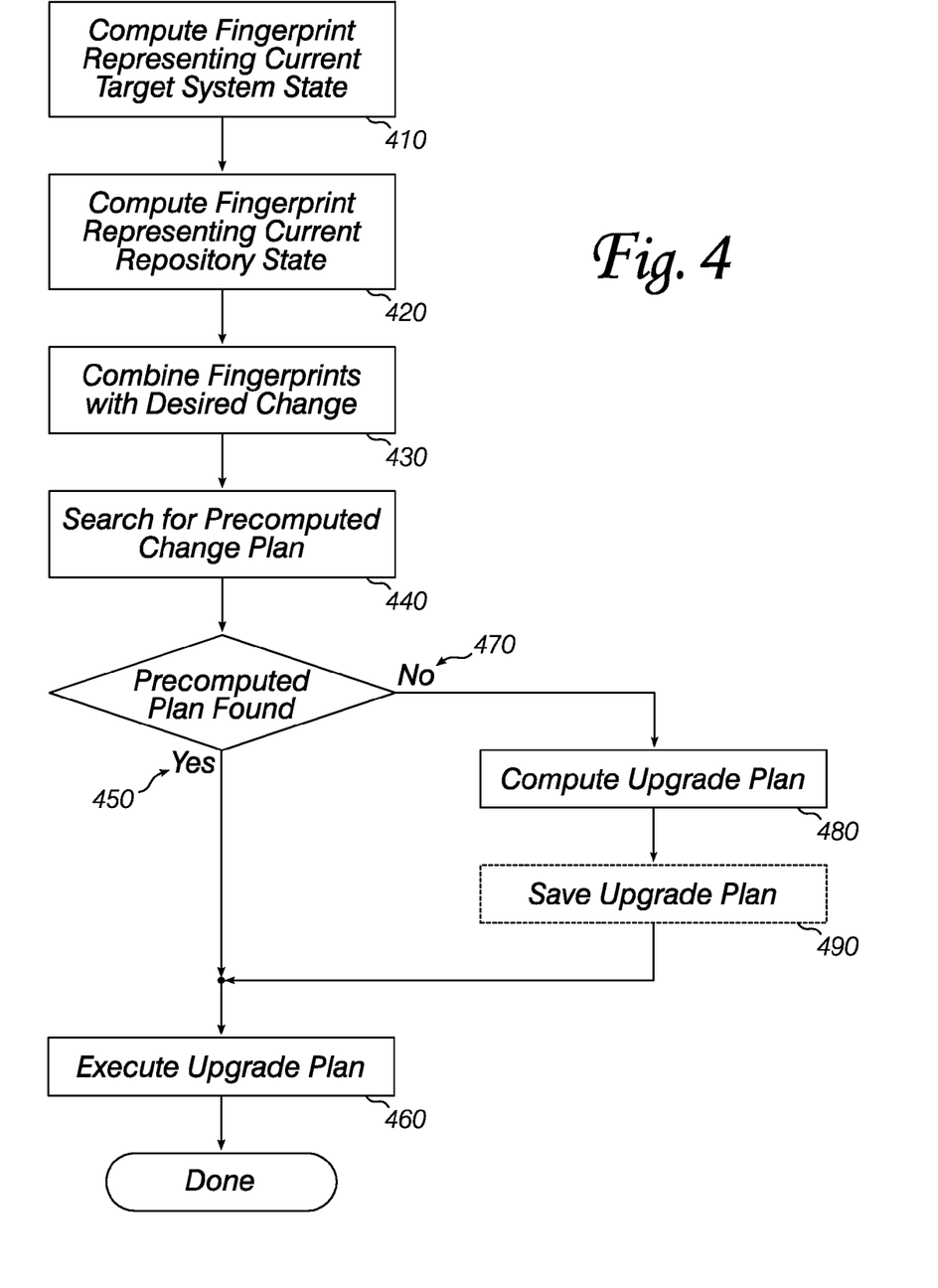
FIG. 4 is a flow chart showing how an embodiment of the invention can be used in connection with component installation.

The method outlined in FIG. 2 for quickly bringing a computer system up to date with respect to a software repository can be extended to include affirmative configuration changes as well as simple updates. For example, consider a target system in a first state. The administrator of the system wishes to install a new software package from the repository. Before installing this package, the target system may or may not be up-to-date with respect to the repository. FIG. 4 is a flow chart describing how the combined installation and updating can be performed.

First, a fingerprint representing the target system's present configuration is computed (410). A second fingerprint representing the repository state is computed (420), and the two fingerprints are combined with a third element specifying the desired configuration change (e.g., "Install NewPackage") (430) to produce an operation token. A database of precomputed change plans, keyed by operation tokens, is searched to find a change plan that will produce the desired configuration, given the target's current ("start") configuration and the current repository state (440). If a precomputed change plan is found (450), it can be executed immediately (460). If no precomputed plan exists (470), traditional dependency resolution procedures are used to create a plan (480), and the plan may be saved in the database (490) to accelerate the upgrade process for another machine. Finally, the just-computed plan is executed (460). Note that the method of FIG. 4 can be used in place of the method of FIG. 2 by setting the desired configuration change to "update only."

It is worth noting specifically that the method outlined with reference to FIG. 4 can be applied to remove a package as well as to install one (simply specify "Remove UnnecessaryPackage" as the desired configuration change, and search for an applicable change plan). Removing a package may require the removal of other packages that depend on the first package, or the installation of a different package to satisfy the requirements of these other packages. A desired configuration change may be more complex than simply adding or removing a single package. For example, the user may wish to change the system from a "Writer" system to an "Artist" system—this might entail removing many packages, and installing many new ones. A precomputed plan may optimize the change by not removing a package that is part of the Writer system, if the same package would have to be reinstalled as part of the Artist system.

Also, note that the target system's present configuration state may be empty (null), if the method is being used to perform an initial installation of components from a repository. In fact, this is a common scenario, and one in which an embodiment of the invention provides great benefit. A software publisher can provide available components on one or more installation media (e.g., CDROMs or DVDs). The media also contain precomputed upgrade plans (installation plans) to configure a new system with various commonly-selected sets of components. A user could still choose components individually, but a new system installation will proceed much faster if an appropriate precomputed plan exists. An embodiment of the invention can also speed the installation of many non-standard, but identical, system configurations: the administrator of these systems would perform a first installation of the non-standard software set, and save the installation plan in a database. All the subsequent system installations can use the saved installation plan, saving time over repeated dependency resolutions performed for each subsequent system.

A software publisher may collect information about configuration changes for which precomputed change plans were not available, so that future distributions are more likely to be useful for customers. For example, if systems containing the "Internet Programs" suite are commonly found to include a firewall component from a "Server" suite, then the publisher may decide to add the firewall component to the basic Internet Programs suite, and to provide appropriate precomputed change plans to assist users in making this common configuration change. The publisher may also offer precomputed installation plans so that the firewall component is included on newly-configured systems when the user selects the Internet Programs suite.

An embodiment of the invention may adjust the list of components from which a fingerprint is computed to exclude irrelevant differences, or to highlight differences that may not be adequately captured in a traditional dependency resolution. For example, consider a software package available in two versions: a generic version suitable for use on any computer, and a special version for use on a computer with a particular central processing unit ("CPU"). If the particular CPU is available, the special version of the software package can provide improved performance. In this situation, the list of components from which the system fingerprint is computed should include an indication that the particular CPU is present. On the other hand, some information about system configurations may not be material to deciding whether a change plan is applicable, and may only prevent a usable plan from being identified. For example, if the CPU mentioned above was available in a "1000" speed and a "2000" speed (the CPUs being otherwise identical), including the speed information in the list of component information from which the system fingerprint is computed would change the fingerprint so that a "CPU-2000" system would not find a precomputed change plan prepared by a "CPU-1000" system, even though that plan would be acceptable. Thus, in some embodiments, preparing the list of system components may include adding information to the list, or filtering information out of the list, before sorting the list and computing the fingerprint.

Figure 5:
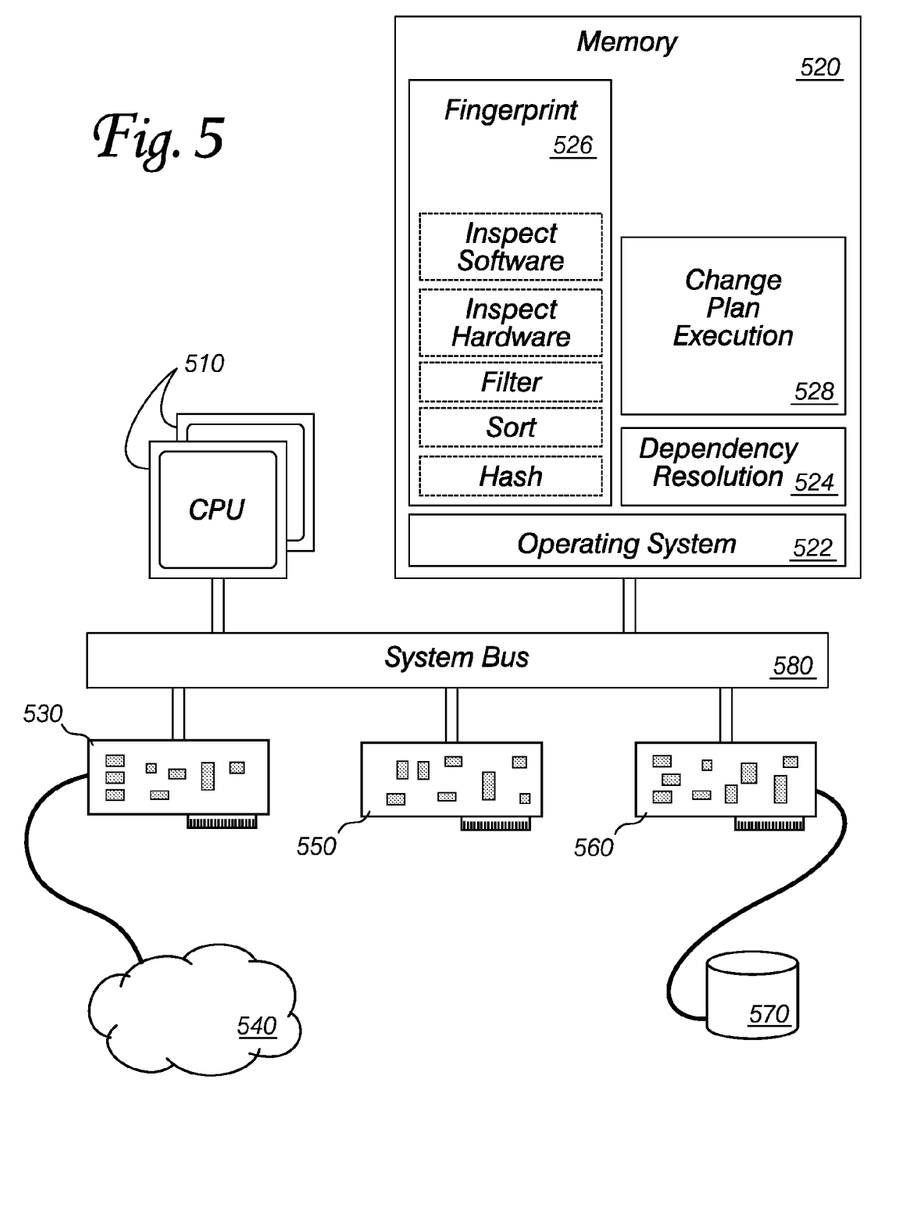
FIG. 5 shows a computer system that incorporates an embodiment of the invention.

FIG. 5 is a block diagram of a computer system that contains an embodiment of the invention. Elements 510 are programmable processors or "CPUs" that execute instructions stored in memory 520 to perform operations as described above. Instructions in memory 520 may be grouped into logically-related units, such as operating system 522 or dependency resolution logic 524. Fingerprint logic 526 includes instructions to inspect the software and hardware configuration of the system, to filter immaterial information out of a configuration list, to sort the list, and to produce a hash of the sorted list. Change plan execution logic 528 can install, remove and/or configure components according to a precomputed plan located in a database, or a plan generated by dependency resolution logic 524. A network interface 530 permits the system to communicate with other computers via a distributed data network 540 such as the Internet. This system can retrieve precomputed change plans and updated software components from an online publisher. Sound card 550 is an example of a hardware component that might be listed in the system's configuration; listing such hardware helps select corresponding software components (drivers) to get the best performance possible from the system. A mass storage interface 560 permits the system to read and write data on a hard disk 570. System bus 580 carries data and control signals between the various components shown here.

Figure 6:
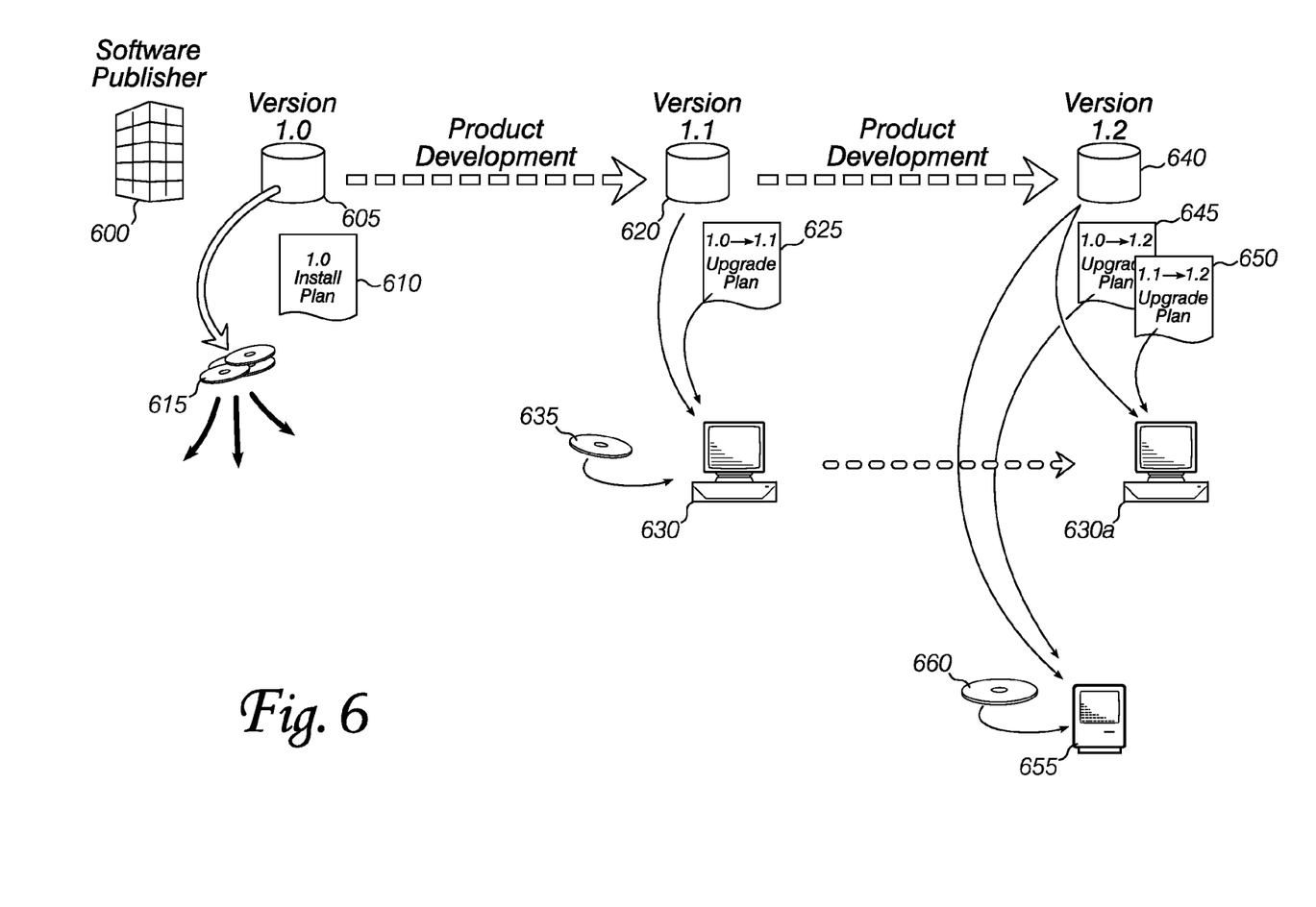
FIG. 6 shows how an embodiment of the invention fits into a broader software marketplace.

FIG. 6 shows how embodiments of the invention may fit into a broader "ecosystem" of software development and distribution. A software publisher 600 prepares an initial release of a software system ("Version 1.0," 605). Part of the release is precomputed installation plans 610 for installing common configurations onto bare computer systems. Computer-readable media 615 such as CDROMs or DVDs, containing data corresponding to version 1.0 of the software system and the precomputed installation plans are produced and distributed into the marketplace.

Engineers at the software publisher 600 continue to improve and extend the software system, eventually producing a new release ("Version 1.1, 620). Some portions of the new release may be identical to the earlier-released system, while other portions may be changed, and still others may be completely new. Part of the new release is precomputed upgrade plans 625 for upgrading various system 1.0 configurations that may have been installed. A user's system 630 may be initialized with a version 1.0 distribution medium 635, using one of the precomputed installation plans provided. After installation, system 630 may contact the software publisher 600 via a distributed data network such as the Internet and obtain a precomputed upgrade plan 625 for updating the newly-installed system to the most recent version of the software system. The appropriate precomputed upgrade plan is selected according to a system fingerprint that system 630 computes and transmits to the software publisher; query logic at the software publisher locates a corresponding upgrade plan from a database of upgrade plans indexed by fingerprints and returns the plan to system 630. New software packages may be downloaded from a web server or file transfer protocol ("FTP") server that offers the publisher's version 1.1 repository 620. Downloaded packages are installed according to precomputed upgrade plan 625. If no precomputed upgrade plan applicable to the initial installation of version 1.0 at system 630 is available (i.e., the query logic is unable to find a plan that matches system 630's fingerprint), system 630 may compute such a plan using traditional dependency resolution procedures and upload the plan to software publisher 600 for use by other systems.

At the software publisher 600, development continues, and eventually a new version 1.2 of the software system is produced (640). Version 1.2 includes a number of precomputed upgrade plans 645, 650, suitable for updating systems containing various earlier versions of the software system. For example, system 630 (identified at this later point in time as 630a) may upgrade its version 1.1 software system to version 1.2 by obtaining precomputed upgrade plan 650 and any necessary software packages from repository 640. Another system 655, newly installed with a version 1.0 distribution medium 660, may be upgraded from version 1.0 directly to version 1.2 by following precomputed upgrade plan 645 available from software publisher 600.

An embodiment of the invention may be a machine-readable medium having stored thereon data and instructions to cause a programmable processor to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

Figure 7:
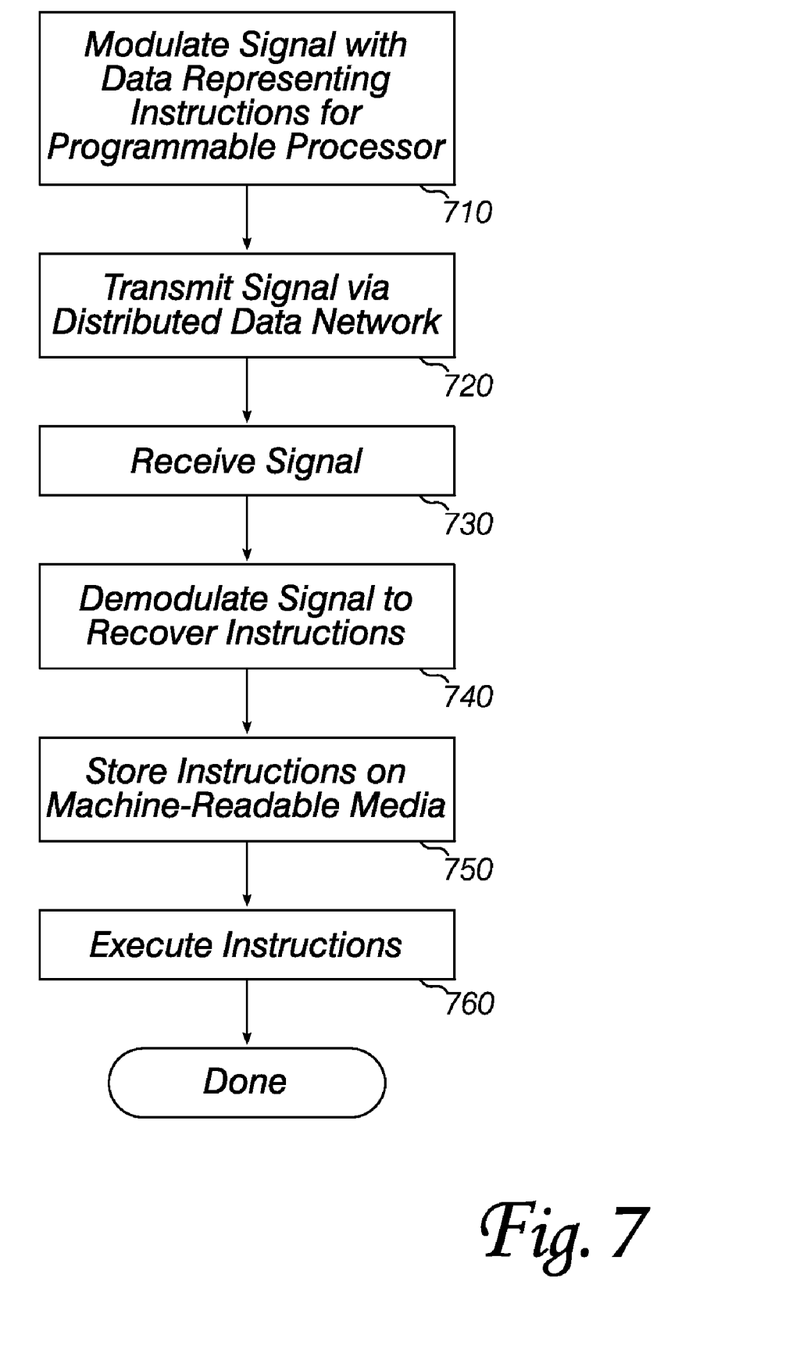
FIG. 7 shows how software implementing an embodiment of the invention can be distributed.

In some embodiments, the instructions for a programmable processor may be treated as data and manipulated as described in FIG. 7. At a first station, a carrier signal is modulated to encode data representing the instructions for a programmable processor (710). The modulated, data-bearing signal is transmitted over a distributed data network (720) such as the Internet, where it is received by a second station (730). The signal is demodulated to recover the data representing instructions for a programmable processor (740), and those instructions are saved on one or more machine-readable media (750). Finally, a programmable processor at the second station executes the instructions (760) to cause the second station to perform operations according to an embodiment of the invention. In the vernacular, such modulation and transmission are known as "serving" the instructions, while receiving and demodulating are often called "downloading." In other words, one embodiment "serves" (i.e., encodes and sends) the instructions of an embodiment to a client, often over a distributed data network like the Internet. The instructions thus transmitted can be saved on a hard disk or other data storage device at the receiver to create another embodiment of the invention, meeting the description of a machine-readable medium storing data and instructions to perform some of the operations discussed above. Executing such an embodiment at the receiver may result in the receiver performing operations according to a third embodiment.

In the preceding description, numerous details were set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions were presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, compact disc read-only memory ("CD-ROM"), and magnetic-optical disks, read-only memories (ROMs), random access memories (RAMs), eraseable, programmable read-only memories ("EPROMs"), electrically-eraseable read-only memories ("EEPROMs"), magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

The applications of the present invention have been described largely by reference to specific examples and in terms of particular allocations of functionality to certain hardware and/or software components. However, those of skill in the art will recognize that accelerated package dependency checking and configuration-change planning can also be achieved by software and hardware that distribute the functions of embodiments of this invention differently than herein described. Such variations and implementations are understood to be captured according to the following claims.

I claim:

1. A computer-implemented method comprising:
    sorting a list of installed hardware and software components of a computer system;
    creating a fingerprint from the sorted list of installed hardware and software components to represent a current state of the computer system;
    searching a data store of a plurality of precomputed upgrade plans for a precomputed upgrade plan that matches the fingerprint, each precomputed upgrade plan providing instructions to change a system configuration from a first consistent configuration comprising a first subset of a set of software packages to a second consistent configuration comprising a second subset of the set of software packages, the data store indexed by fingerprints;
    executing a dependency resolution procedure to create an upgrade plan if no precomputed upgrade plan matches the fingerprint and executing the created precomputed upgrade plan to update the current state of the computer system; and
    executing the matching precomputed upgrade plan to update the current state of the computer system without executing the dependency resolution procedure if a precomputed upgrade plan matches the fingerprint.

2. The computer-implemented method of claim 1, further comprising:
    computing an upgrade plan based on the installed hardware and software components of the computer system, and
    storing the upgrade plan in the data store as the precomputed upgrade plan associated with the fingerprint.

3. The computer-implemented method of claim 1, wherein executing the dependency resolution procedure to create the upgrade plan comprises:
    transmitting the fingerprint to a software publisher; and
    receiving the precomputed upgrade plan corresponding to the fingerprint from the software publisher.

4. The computer-implemented method of claim 1, further comprising:
    filtering the list to remove at least one irrelevant installed hardware and software component from the list.

5. The computer-implemented method of claim 1 wherein the list of installed hardware and software components comprises a list of software packages installed on the computer system, each list element in the list of software packages comprising an indication of a version of the software package.

6. The computer-implemented method of claim 1 wherein the list of installed hardware and software components comprises an identifier of a hardware device installed on the computer system.

7. The computer-implemented method of claim 1 wherein the list of installed hardware and software components comprises a list of software packages installed on the computer system, each list element in the list of software packages comprising a hash of a corresponding installed software package.

8. The computer-implemented method of claim 1 wherein the identified precomputed upgrade plan specifies at least one of:
    removing an unnecessary software package;
    installing a new required package; or
    replacing an upgraded package with a new version of the upgraded package.

9. The computer-implemented method of claim 1 wherein creating the fingerprint comprises computing a hash of the sorted list using a Secure Hash Algorithm 1 ("SHA-1").

10. The computer-implemented method of claim 1 wherein creating the fingerprint comprises computing a hash of the sorted list using a Message Digest number 5 ("MD5") algorithm.

11. A non-transitory machine-readable medium storing instructions to cause a programmable processor to perform operations comprising:
    sorting a list of installed hardware and software components of a computer system;
    computing a fingerprint from the sorted list of installed hardware and software components to represent a current state of the computer system;
    searching a data store of a plurality of precomputed upgrade plans for a precomputed upgrade plan that matches the fingerprint, each precomputed upgrade plan providing instructions to change a system configuration from a first consistent configuration comprising a first subset of a set of software packages to a second consistent configuration comprising a second subset of the set of software packages, the data store indexed by fingerprints;
    executing a dependency resolution procedure to create an upgrade plan if no precomputed upgrade plan matches the fingerprint and executing the created precomputed upgrade plan to update the current state of the computer system; and
    executing the matching precomputed upgrade plan to update the current state of the computer system without executing the dependency resolution procedure if a precomputed upgrade plan matches the fingerprint.

12. The non-transitory machine-readable medium of claim 11, further comprising:
    computing an upgrade plan based on the installed hardware and software components of the computer system; and
    storing the upgrade plan in the data store as the precomputed upgrade plan associated with the fingerprint.

13. The non-transitory machine-readable medium of claim 11, wherein executing the dependency resolution procedure to create the upgrade plan comprises:
    transmitting the fingerprint to a software publisher; and
    receiving a precomputed upgrade plan corresponding to the fingerprint from the software publisher.

14. The non-transitory machine-readable medium of claim 11, further comprising:
    filtering the list to remove at least one irrelevant installed hardware and software component from the list.

15. The non-transitory machine-readable medium of claim 11, wherein computing the fingerprint comprises calculating a hash of the sorted list using a Message Digest number 5 ("MD5") algorithm.

16. The non-transitory machine-readable medium of claim 11, wherein the list of installed hardware and software components comprises a plurality of identifiers of software packages installed on the computer system, each software package identifier comprising a version indication of the software package.

17. The non-transitory machine-readable medium of claim 11, wherein sorting the list comprises sorting the list of installed hardware and software components as American Standard Code for Information Interchange (ASCII) strings.

18. The non-transitory machine-readable medium of claim 11, wherein computing the fingerprint comprises calculating a hash of the sorted list using Secure Hash Algorithm 1 ("SHA-1").

19. A system comprising:
a repository comprising a set of software packages, each of the software packages having dependencies on zero or more other packages of the set of software packages;
a database comprising a plurality of precomputed upgrade plans, each upgrade plan providing instructions to change a system configuration from a first consistent configuration comprising a first subset of the set of software packages to a second consistent configuration comprising a second subset of the set of software packages, the database indexed by fingerprints;
a memory;
a processor coupled to the memory; and
query logic executed from the memory by the processor to receive a fingerprint created from a sorted list of hardware components and software components installed on a client system to represent a current state of the client system from the client system, search the database of the plurality of precomputed upgrade plans for a precomputed upgrade plan that matches the fingerprint, execute a dependency resolution procedure to create an upgrade plan if no precomputed upgrade plan matches the fingerprint and execute the created precomputed upgrade plan to update the current state of the client system, and execute the matching precomputed upgrade plan to update the current state of the client system without executing the dependency resolution procedure if a precomputed upgrade plan matches the fingerprint.

20. The system of claim 19, further comprising:
a data server to transmit a software package to the client system in response to a request from the client system as the client system executes the precomputed upgrade plan.

\* \* \* \* \*